US011247406B2

(12) United States Patent
Tanaka et al.

(10) Patent No.: US 11,247,406 B2
(45) Date of Patent: Feb. 15, 2022

(54) THREE-DIMENSIONAL OBJECT AND METHOD FOR FORMING THREE-DIMENSIONAL OBJECT

(71) Applicant: MIMAKI ENGINEERING CO., LTD., Nagano (JP)

(72) Inventors: Yoshihiro Tanaka, Nagano (JP); Kosuke Kobayashi, Nagano (JP); Yoshikazu Furukawa, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 830 days.

(21) Appl. No.: 15/788,392

(22) Filed: Oct. 19, 2017

(65) Prior Publication Data

US 2018/0111329 A1    Apr. 26, 2018

(30) Foreign Application Priority Data

Oct. 21, 2016    (JP) .............................. JP2016-207143

(51) Int. Cl.
```
B29C 65/50      (2006.01)
B33Y 10/00      (2015.01)
B29C 64/112     (2017.01)
B29C 64/118     (2017.01)
B33Y 80/00      (2015.01)
B29K 101/12     (2006.01)
```
(52) U.S. Cl.
CPC ............ *B29C 65/50* (2013.01); *B29C 64/112* (2017.08); *B29C 64/118* (2017.08); *B33Y 10/00* (2014.12); *B29K 2101/12* (2013.01); *B33Y 80/00* (2014.12)

(58) Field of Classification Search
CPC ..... B29C 66/54; B29C 66/543; B29C 64/112; B29C 64/171
See application file for complete search history.

(56) References Cited

U.S. PATENT DOCUMENTS

| 9,676,159 | B2* | 6/2017 | Sterman | B33Y 50/02 |
| 2005/0069784 | A1* | 3/2005 | Gothait | B29C 64/40 430/5 |
| 2013/0040091 | A1* | 2/2013 | Dikovsky | B29C 64/106 428/68 |
| 2017/0056733 | A1* | 3/2017 | Hartelius | A01K 15/025 |
| 2018/0208797 | A1* | 7/2018 | Achenbach | C08L 83/04 |

FOREIGN PATENT DOCUMENTS

| JP | 2015-186851 A | 10/2015 |
| JP | 2015-221526 A | 12/2015 |

OTHER PUBLICATIONS

Japanese Office Action (JPOA) dated Mar. 17, 2020 issued in corresponding Japanese Patent Application No. 2016-207143 and its English translation.

* cited by examiner

*Primary Examiner* — Galen H Hauth
(74) *Attorney, Agent, or Firm* — Rankin, Hill & Clark LLP

(57) ABSTRACT

A three-dimensional object includes an outer-layer member and an inner structural member. The outer-layer member is a layer to constitute the surface of the three-dimensional object, and includes an inner space. The outer-layer member is made up of a plurality of divided outer-layer pieces formed of build material, which is functional ink ejected from a droplet ejection head and cured. The inner structural member is disposed in the inner space of the outer-layer member and configured to support the outer-layer member.

5 Claims, 12 Drawing Sheets

THREE-DIMENSIONAL OBJECT AND METHOD FOR FORMING THREE-DIMENSIONAL OBJECT

CROSS-REFERENCE TO RELATED APPLICATIONS

The present application claims priority under 35 U.S.C. § 119 to Japanese Patent Application No. 2016-207143, filed Oct. 21, 2016. The contents of this application are incorporated herein by reference in their entirety.

BACKGROUND OF THE INVENTION

Field of the Invention

The present invention relates to a three-dimensional object and a method for forming a three-dimensional object.

Discussion of the Background

Three-dimensional forming apparatuses have been known for depositing a plurality of layers of build material on the build surface successively in a deposition direction to form a three-dimensional object. In these three-dimensional forming apparatuses, ultraviolet curable ink, which is cured when irradiated with ultraviolet light, for example, is used as functional ink. The ultraviolet curable ink thus cured serves as the build material. As an exemplary three-dimensional object formed by such a three-dimensional forming apparatus, Japanese Unexamined Patent Application Publication No. 2001-18297 discloses a three-dimensional model produced by curing ink to form layers of curable resin and depositing the layers successively based on cross-sectional slice information of the three-dimensional model.

The contents of Japanese Unexamined Patent Application Publication No. 2001-18297 are incorporated herein by reference in their entirety.

Now, suppose forming a three-dimensional object of a remarkably large size. Since the size of objects formable by a three-dimensional forming apparatus is fixed, it becomes difficult to form a three-dimensional object of a size exceeding the formable size. In order to form the whole large-sized three-dimensional object of ultraviolet curable ink, use of a significant amount of the ink is required to unfortunately increase forming cost and work time. Moreover, forming the large-sized three-dimensional object wholly of the ultraviolet curable ink causes a disadvantageous increase in weight of the three-dimensional object.

In this case, to decrease the weight of the three-dimensional object, it is considered to make the three-dimensional object hollow. There is, however, a possibility that the strength of the three-dimensional object will be insufficient. The hollow three-dimensional object has an inner space, which may be filled with needless build material such as support material in some cases. Consequently, to remove this build material, there are cases in which the three-dimensional object has a dividable configuration. In such cases, however, there is a possibility of a decrease in strength of coupling portions of the three-dimensional object in particular.

In view of these circumstances, it is an object of the present invention to provide a three-dimensional object and a method for forming a three-dimensional object that ensure that the three-dimensional object has adequate strength but is readily handleable, and that a cost increase for forming such a three-dimensional object is eliminated or minimized.

SUMMARY OF THE INVENTION

According to one aspect of the present disclosure, a three-dimensional object includes an outer-layer member and an inner structural member. The outer-layer member is a layer to constitute the surface of the three-dimensional object, and includes an inner space. The outer-layer member is made up of a plurality of divided outer-layer pieces formed of build material, which is functional ink ejected from a droplet ejection head and cured. The inner structural member is disposed in the inner space of the outer-layer member and configured to support the outer-layer member.

This configuration ensures that the plurality of divided outer-layer pieces are joined together to constitute the outer-layer member so as to dispose the inner structural member in the inner space of the outer-layer member. Consequently, adequate strength of the whole three-dimensional object is secured. The inner structural member is reduced in weight to reduce the weight of the three-dimensional object as a whole. Therefore, even the three-dimensional object having a large size is readily handleable. Moreover, the inner structural member is formed of a material available at low cost, which is different from the functional ink, to reduce cost for forming the three-dimensional object. Furthermore, since the outer-layer pieces may be formed using the droplet ejection head, efficiency of the formation work is improved as compared with a case of forming the whole three-dimensional object. At the same time, the inner structural member is formed by the efficient forming method so as to further improve the efficiency of the formation work.

In the aspect of the present disclosure, the functional ink may be ultraviolet curable ink, which is cured when irradiated with ultraviolet light. The outer-layer pieces may be formed of ultraviolet curable resin, as the build material, which is the ultraviolet curable ink that has been cured. The inner structural member may be formed of thermoplastic resin, which is fused filament that has been cured.

This configuration ensures that the outer-layer pieces are formed of the ultraviolet curable resin, and that the inner structural member is formed of the thermoplastic resin. Thus, the outer-layer pieces and the inner structural member are formed of different materials. This enables the outer-layer pieces to be formed of a material suitable for the outer-layer pieces, and enables the inner structural member to be formed of a material suitable for the inner structural member. It should be noted that the inner structural member is formed by fused deposition molding (FDM), for example, and formed as a structure having a space inside.

In the aspect of the present disclosure, the inner structural member may have an outer surface, which is opposed to an inner surface of the outer-layer member, at least partly deformed.

This configuration ensures that when the outer surface of the inner structural member physically interferes with the inner surface of the outer-layer member, the outer surface of the inner structural member is elastically deformed or plastically deformed to support the outer-layer member while suppressing deformation of the outer-layer member. Consequently, occurrence of distortion of the outer-layer member is eliminated or minimized to keep the outer-layer member in an appropriate shape, and the outer-layer member is suitably supported by the inner structural member.

In the aspect of the present disclosure, the functional ink may be ultraviolet curable ink, which is cured when irradiated with ultraviolet light. The outer-layer pieces may be formed of ultraviolet curable resin, as the build material, which is the ultraviolet curable ink that has been cured. The inner structural member may be formed of filling material, which fills up the inner space of the outer-layer member.

This configuration ensures that the outer-layer pieces are formed of the ultraviolet curable resin, and that the inner structural member is formed of the filling material. Thus, the outer-layer pieces and the inner structural member are formed of different materials. As the filling material, for example, material such as urethane foam and styrene foam is used. Consequently, the filling material is merely filled in the inner space of the outer-layer member to form the inner structural member, thus facilitating formation of the inner structural member.

In the aspect of the present disclosure, the weight of the inner structural member per unit volume may be lighter than the weight of the outer-layer member per unit volume.

This configuration ensures that the inner structural member is reduced in weight to accordingly reduce the three-dimensional object in weight. Consequently, even the three-dimensional object having a large size is readily handleable.

In the aspect of the present disclosure, the three-dimensional object may further include an adhesive layer interposed between the inner structural member and the outer-layer member and configured to bond the inner structural member and the outer-layer member to each other.

This configuration ensures that the inner structural member and the outer-layer member are suitably bonded together through the adhesive layer so as to prevent the outer-layer member from coming off the inner structural member. As an adhesive for the adhesive layer, any of epoxy, rubber, and vinyl acetate adhesives may be used insofar as it is capable of adhering the ultraviolet curable resin to the thermoplastic resin, for example.

In the aspect of the present disclosure, the inner structural member may have such a size that a clearance is defined between the inner structural member and the outer-layer member. The adhesive layer may fill up the clearance between the inner structural member and the outer-layer member.

This configuration ensures that the inner structural member is appropriately accommodated in the inner space of the outer-layer member, and that the adhesive layer fills up the clearance so as to make the inner structural member appropriately support the outer-layer member.

In the aspect of the present disclosure, the outer-layer pieces may each include at least one coupling portion to be coupled to another of the outer-layer pieces.

This configuration ensures that since the outer-layer pieces are coupled to each other through the coupling portions, the plurality of outer-layer pieces are assembled with high accuracy while the outer-layer pieces are prevented from being separated from each other so as to make the outer-layer member have an appropriate shape.

In the aspect of the present disclosure, the outer-layer member may be divided into the plurality of outer-layer pieces by a plurality of planes parallel to each other and at intervals of a predetermined height.

This configuration ensures that the outer-layer pieces having the predetermined height are formed by the droplet ejection head. Consequently, decreasing the height of the outer-layer pieces ensures rapid formation of the outer-layer pieces to improve efficiency of formation work of the outer-layer pieces.

In the aspect of the present disclosure, the outer-layer member may be divided into the plurality of outer-layer pieces in accordance with a plurality of characteristic regions.

This configuration ensures that since the outer-layer pieces are formed in accordance with the respective characteristic regions, division lines of the outer-layer member, which is an assembly of the plurality of outer-layer pieces, are made inconspicuous to enhance priority on the design of the three-dimensional object.

According to another aspect of the present disclosure, a method for forming a three-dimensional object includes forming an outer-layer member, forming an inner structural member, and bonding the outer-layer member to an outer surface of the inner structural member so as to constitute the three-dimensional object. The outer-layer member is a layer to constitute the surface of the three-dimensional object, and includes an inner space. The outer-layer member is made up of a plurality of divided outer-layer pieces. At the outer-layer member formation step, functional ink is ejected from a droplet ejection head, and the ejected functional ink is cured to form the outer-layer pieces. The inner structural member is disposed in the inner space of the outer-layer member and configured to support the outer-layer member.

This configuration ensures that the three-dimensional object is formed in such a manner that the inner structural member is disposed in the inner space of the outer-layer member so as to secure adequate strength of the three-dimensional object. The inner structural member is reduced in weight to accordingly reduce the weight of the three-dimensional object. Therefore, even the three-dimensional object having a large size is readily handleable. Moreover, the inner structural member is formed of a material available at low cost, which is different from the functional ink, to reduce cost for forming the three-dimensional object. Furthermore, since the outer-layer pieces may be formed by the droplet ejection head, efficiency of the formation work is improved as compared with a case of forming the whole three-dimensional object. At the same time, the inner structural member is formed by the efficient forming method so as to further improve the efficiency of the formation work.

According to the other aspect of the present disclosure, a method for forming a three-dimensional object includes forming an outer-layer member and filling an inner space of the outer-layer member with filling material to constitute an inner structural member so as to constitute the three-dimensional object. The outer-layer member is a layer to constitute the surface of the three-dimensional object, and includes the inner space. The outer-layer member is made up of a plurality of divided outer-layer pieces. At the outer-layer member formation step, functional ink is ejected from a droplet ejection head, and the ejected functional ink is cured to form the outer-layer pieces. The inner structural member is configured to support the outer-layer member. At the filling step, after the plurality of outer-layer pieces are assembled to form the outer-layer member including the inner space, the inner space of the outer-layer member is filled with the filling material.

This configuration ensures that the three-dimensional object is formed in such a manner that the inner structural member is disposed in the inner space of the outer-layer member so as to secure adequate strength of the three-dimensional object. The inner structural member, which is formed of the filling material, is reduced in weight to accordingly reduce the weight of the three-dimensional object. Therefore, even the three-dimensional object having a large size is readily handleable. Moreover, the inner structural member is formed of the filling material available at low cost to reduce cost for forming the three-dimensional object. Furthermore, since the outer-layer pieces may be formed using the droplet ejection head, efficiency of the formation work is improved as compared with a case of forming the whole three-dimensional object. At the same time, the inner structural member is formed by merely filling the inner space of the outer-layer member with the filling material so as to further improve the efficiency of the formation work.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
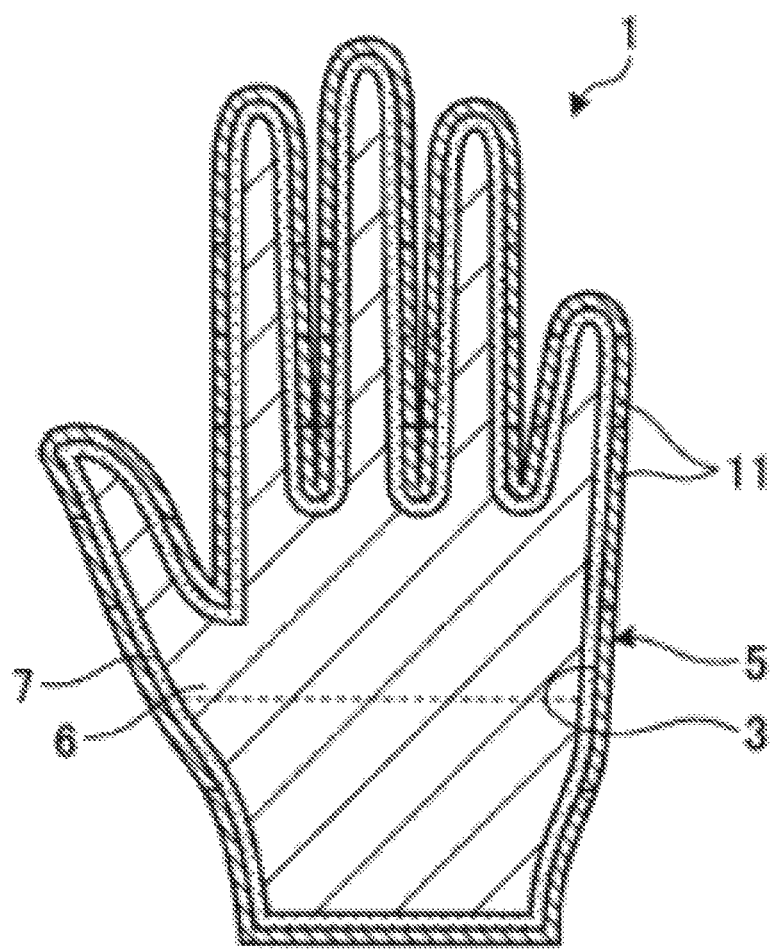
FIG. 1 is a cross-sectional view of a three-dimensional object according to embodiment 1.

The embodiments will now be described in detail with reference to the accompanying drawings, wherein like reference numerals designate corresponding or identical elements throughout the various drawings. The following embodiments are provided for exemplary purposes only and are not intended to limit the present disclosure. The elements and/or components described in the embodiments encompass those elements and/or components readily found by one of ordinary skill in the art as replacements, and encompass substantially identical elements and/or components. Moreover, the elements and/or components in the following description are combinable as desired. The plurality of embodiments are also combinable with one another.

Embodiment 1

Figure 2:
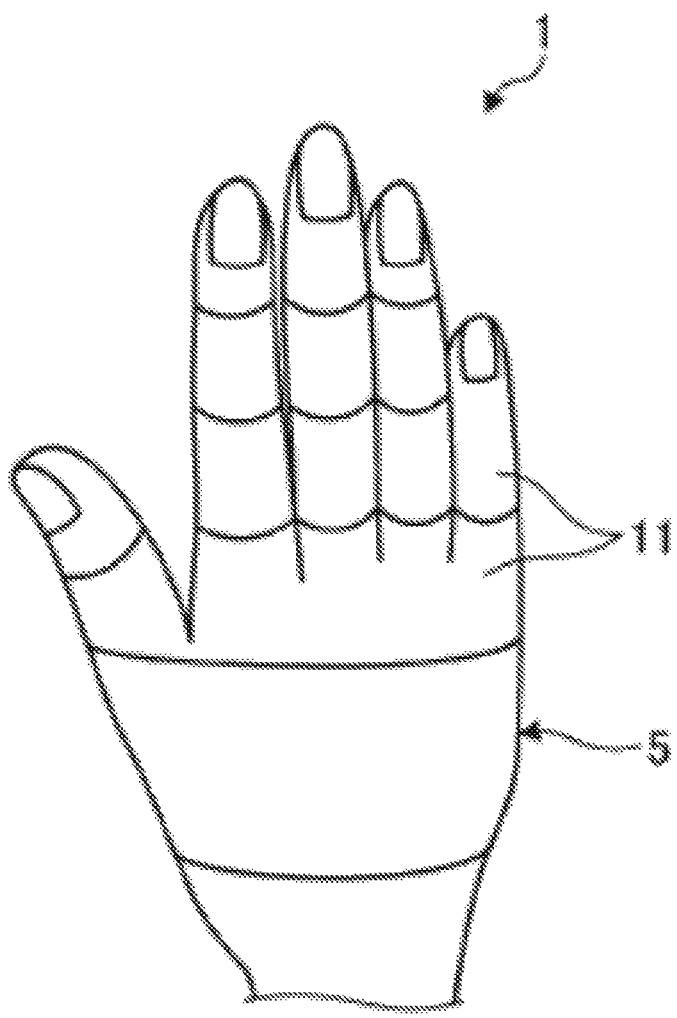
FIG. 2 is an external front view of the three-dimensional object according to embodiment 1, indicating its division lines.
Figure 3:
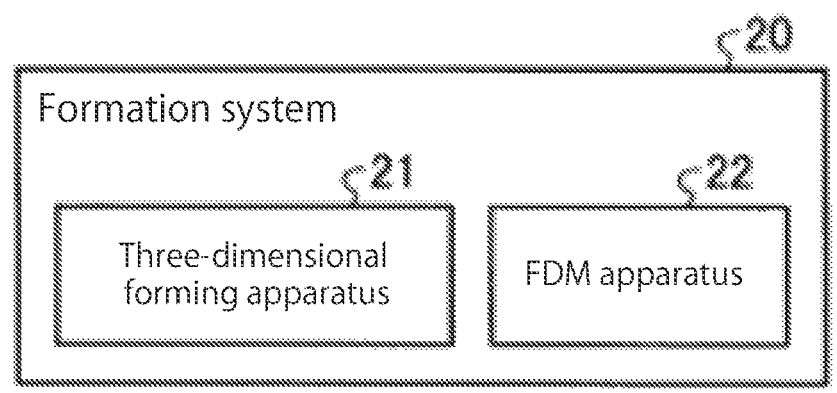
FIG. 3 is a diagram illustrating a schematic configuration of a formation system to form the three-dimensional object according to embodiment 1.
Figure 4:
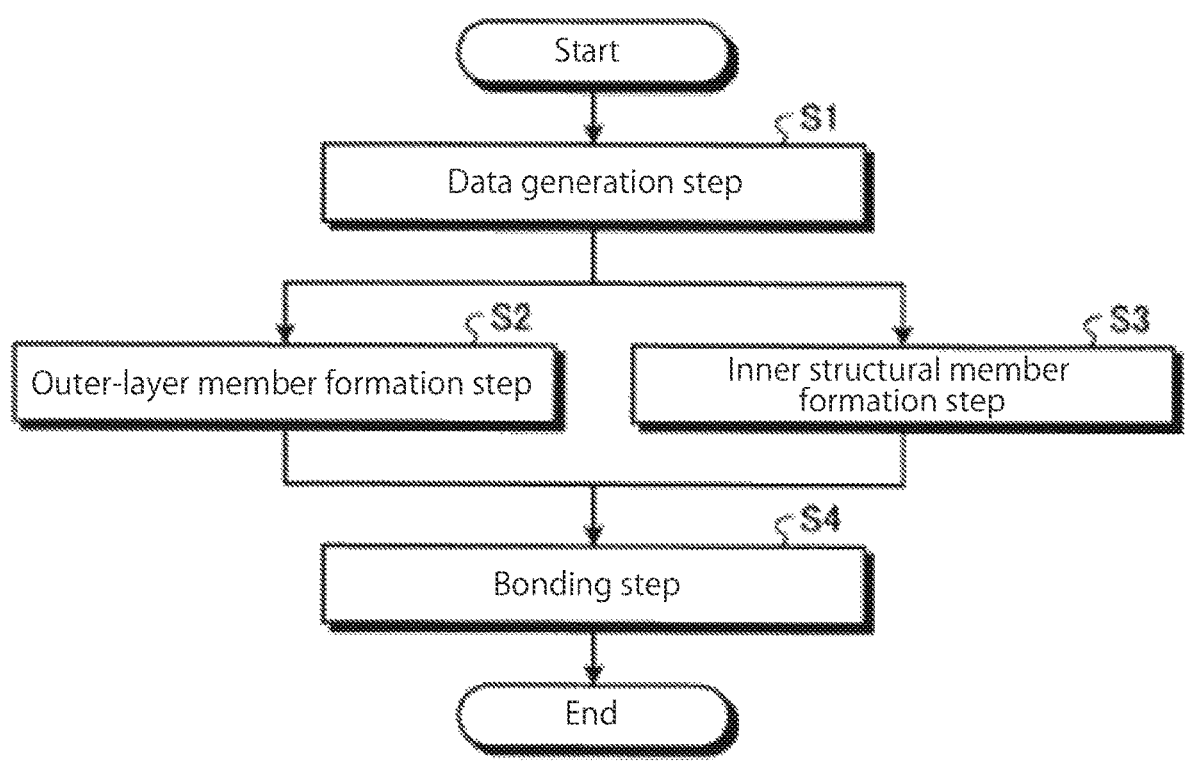
FIG. 4 is a flowchart of a method for forming the three-dimensional object according to embodiment 1.
Figure 5:
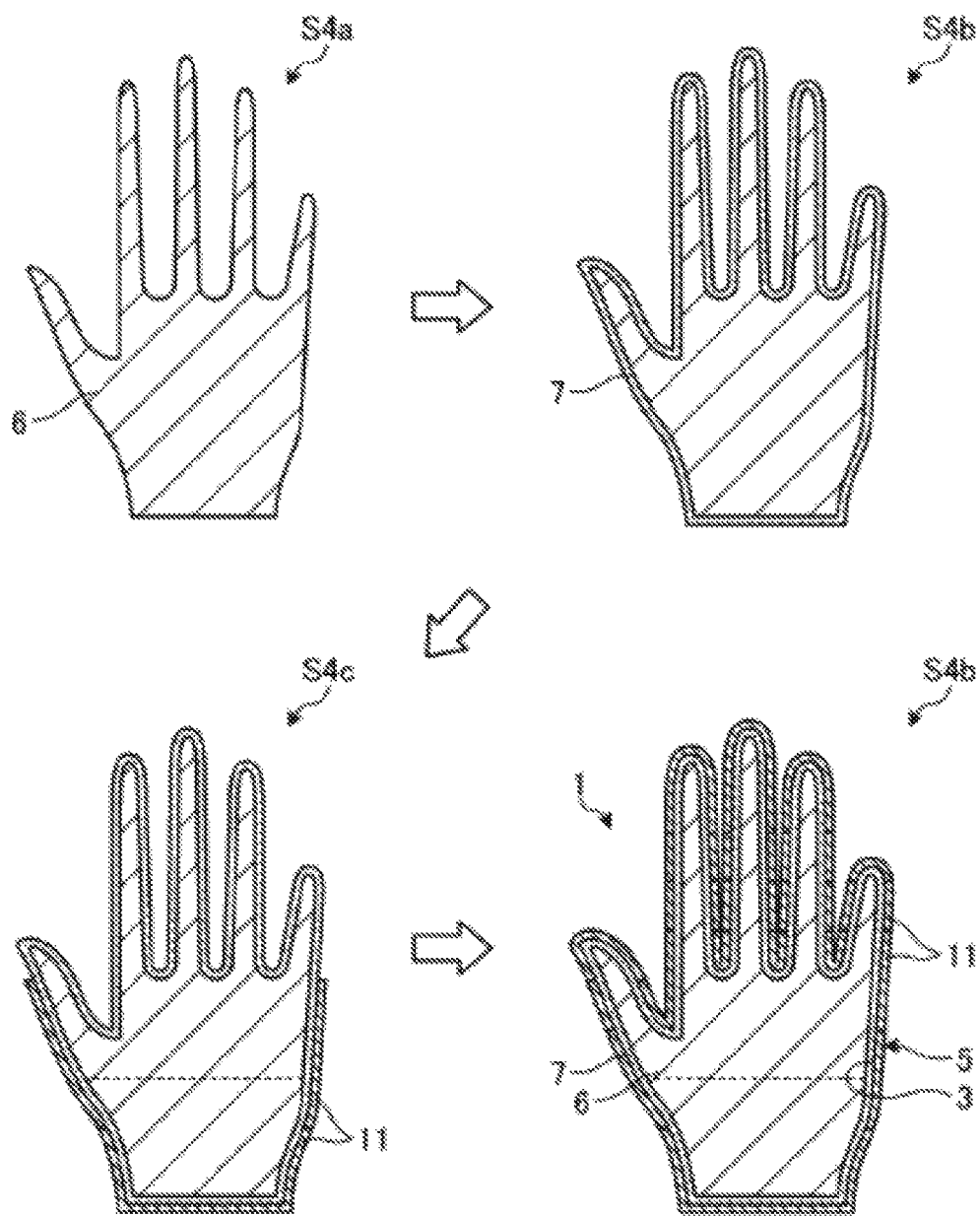
FIG. 5 is a diagram illustrating the method for forming the three-dimensional object according to embodiment 1.

FIG. 1 is a cross-sectional view of a three-dimensional object according to embodiment 1. FIG. 2 is an external front view of the three-dimensional object according to embodiment 1, indicating its division lines. FIG. 3 is a diagram illustrating a schematic configuration of a formation system to form the three-dimensional object according to embodiment 1. FIG. 4 is a flowchart of a method for forming the three-dimensional object according to embodiment 1. FIG. 5 is a diagram illustrating the method for forming the three-dimensional object according to embodiment 1.

The three-dimensional object 1 in embodiment 1 is a solid in three dimensions formed by combining a plurality of divided parts. As illustrated in FIGS. 1 and 2, the three-dimensional object 1 has a shape of a hand, for example. The following description will refer to the case in which the three-dimensional object 1 has the hand shape. The three-dimensional object 1, however, should not be limited to the hand shape but may have any other shape. The three-dimensional object 1 includes an outer-layer member 5, an inner structural member 6, and an adhesive layer 7. The outer-layer member 5 includes an inner space 3. The inner structural member 6 is disposed in the inner space 3. The adhesive layer 7 is interposed between the outer-layer member 5 and the inner structural member 6.

The outer-layer member 5 is a layer to constitute the surface of the three-dimensional object 1. The outer-layer member 5 may have the surface colored or may have the surface non-colored and have a color of build material as it is. Coloring of the surface of the outer-layer member 5 should not be particularly limited. The outer-layer member 5 is made of build material, which is functional ink ejected from an ink-jet head (droplet ejection head) and cured. In this embodiment, as the functional ink, ultraviolet curable ink, for example, which is cured when irradiated with ultraviolet light, is used. Consequently, the outer-layer member 5 is made of ultraviolet curable resin as the material, which resin is the cured ultraviolet curable ink. Kinds of the ultraviolet curable ink include, but are not limited to, a white ink, coloring inks of cyan (C), magenta (M), yellow (Y), and black (K), and a transparent ink, which may be used as desired in accordance with color of the outer-layer member 5 to be formed. The outer-layer member 5 has wholly uniform thickness between an inner surface in contact with the inner space 3, and the top surface (outer surface).

As illustrated in FIGS. 1 and 2, the outer-layer member 5 includes a plurality of divided outer-layer pieces 11. The plurality of outer-layer pieces 11 are combined to constitute the outer-layer member 5. The outer-layer member 5 is divided into the plurality of outer-layer pieces 11 by a plurality of flat cross-sections (planes) parallel to each other. Preferably, heights of the plurality of outer-layer pieces 11 are made uniform to have an identical height in the height direction perpendicular to the cross-sections. When the heights of the plurality of outer-layer pieces 11 are made uniform in a case of forming the plurality of outer-layer pieces 11 by an ink-jet technology, it is ensured that the plurality of outer-layer pieces 11 are formed to have the identical height so as to enhance efficiency of the formation work.

The inner structural member 6, which is disposed in the inner space 3 of the outer-layer member 5, has an outer surface opposed to the inner surface of the outer-layer member 5. The inner structural member 6 is a structure to support the outer-layer member 5. The inner structural member 6 is formed of thermoplastic resin, for example, which is material different from the material of the outer-layer member 5. Specifically, the inner structural member 6 is formed by fused deposition molding (FDM) in which thermofusible filament is cured. This inner structural member 6 is formed as the structure including a framework with a space inside so as to reduce the inner structural member 6 in weight. Consequently, the weight of the inner structural member 6 per unit volume is lighter than the weight of the outer-layer member 5 per unit volume.

The inner structural member 6 has such a size that a clearance is defined between the outer-layer member 5 and the inner structural member 6. That is, between the inner surface of the outer-layer member 5 and the outer surface of the inner structural member 6, such a clearance is defined that the inner structural member 6 is containable in the inner space 3 of the outer-layer member 5. It should be noted that insofar as the inner structural member 6 has a formable size, the inner structural member 6 may be formed as a single object or formed by combining a plurality of object pieces divided by a dotted line indicated in FIG. 1.

The adhesive layer 7 adheres the inner surface of the outer-layer member 5 to the outer surface of the inner structural member 6 to fill up the clearance between the outer-layer member 5 and the inner structural member 6. As an adhesive for the adhesive layer 7, any of epoxy, rubber, and vinyl acetate adhesives may be used insofar as it is capable of adhering ultraviolet curable resin to thermoplastic resin, for example.

The above-described three-dimensional object 1 has the outer-layer member 5 supported by the inner structural member 6 through the adhesive layer 7 so as to secure a predetermined strength. Moreover, decreasing the weight of the inner structural member 6 ensures decreasing the weight of the three-dimensional object 1 as a whole.

Next, by referring to FIG. 3, the formation system 20 to form the three-dimensional object 1 will be described. The formation system 20 includes a three-dimensional forming apparatus 21 and a fused deposition molding (FDM) apparatus 22. The three-dimensional forming apparatus 21 is a 3D printer using the ink-jet technology. The FDM apparatus 22 is a 3D printer using fused deposition molding.

The three-dimensional forming apparatus 21 causes the ink-jet head (droplet ejection head) to eject the ultraviolet curable ink and makes the ejected ultraviolet curable ink cured to form a layer of the build material. Such layers of the build material are deposited layer by layer from the lower side toward the upper side in the vertical direction to form the outer-layer piece 11. Based on outer-layer member formation data, which is formation data of the outer-layer member 5, the three-dimensional forming apparatus 21 makes the ultraviolet curable ink ejected and cured to form the outer-layer piece 11.

The FDM apparatus 22 causes a forming head to fuse and eject the filament including the thermoplastic resin, cures the ejected filament, and deposits the filament from the lower side toward the upper side in the vertical direction to form the inner structural member 6. Based on inner structural member formation data, which is formation data of the inner structural member 6, the FDM apparatus 22 causes the filament to be ejected and cured to form the inner structural member 6.

Next, control for forming the outer-layer member 5 by the above-described three-dimensional forming apparatus 21 and control for forming the inner structural member 6 by the above-described FDM apparatus 22 will be described. Based on formation data of the three-dimensional object 1, the formation system 20 performs control for forming the outer-layer member 5 and control for forming the inner structural member 6. The formation data includes shape data such as polygon data, which is data concerning the shape of the three-dimensional object 1.

Based on the formation data of the three-dimensional object 1, the formation system 20 generates the outer-layer member formation data for forming the outer-layer member 5 and the inner structural member formation data for forming the inner structural member 6. The outer-layer member formation data refers to the shape of the outer-layer member 5, which defines the inner space 3 inside of the three-dimensional object 1. The outer-layer member formation data includes data concerning shapes of the plurality of outer-layer pieces 11 into which the outer-layer member 5 is divided by the plurality of flat cross-sections (planes) parallel to each other. The three-dimensional forming apparatus 21 performs formation control based on the outer-layer member formation data thus generated so as to form the above-described outer-layer pieces 11. The inner structural member formation data is data concerning a shape of the inner structural member 6, which is the rest of the three-dimensional object 1 from which the outer-layer member 5 has been removed. The inner structural member formation data is data concerning the shape of the inner structural member 6, which has the size made smaller than that of the inner space 3 in accordance with the thickness of the clearance between the inner structural member 6 and the outer-layer member 5. The FDM apparatus 22 performs formation control based on the inner structural member formation data thus generated to form the above-described inner structural member 6.

Next, by referring to FIGS. 4 and 5, a flow of the method for forming the three-dimensional object 1 will be described. The method for forming the three-dimensional object 1 includes a data generation step (step S1), an outer-layer member formation step (step S2), an inner structural member formation step (step S3), and a bonding step (step S4). At the data generation step S1, the outer-layer member formation data and the inner structural member formation data are generated. At the outer-layer member formation step S2, the outer-layer member 5 is formed. At the inner structural member formation step S3, the inner structural member 6 is formed. At the bonding step S4, the outer-layer member 5 and the inner structural member 6 are bonded together. It should be noted that in embodiment 1, the outer-layer member formation step S2 and the inner structural member formation step S3 are performed concurrently. The steps S2 and S3, however, may be performed successively and should not be limited to a particular manner.

In the method for forming the three-dimensional object 1, the formation system 20 first generates the outer-layer member formation data and the inner structural member formation data based on the formation data of the three-dimensional object 1 (the data generation step S1). When the outer-layer member formation data and the inner structural member formation data are generated, the three-dimensional forming apparatus 21 performs formation control based on the outer-layer member formation data so as to form the plurality of outer-layer pieces 11 (the outer-layer member formation step S2). When the outer-layer member formation data and the inner structural member formation data are generated, the FDM apparatus 22 performs formation control based on the inner structural member formation data to form the inner structural member 6 (the inner structural member formation step S3) concurrently with the outer-layer member formation step S2.

When the plurality of outer-layer pieces 11 and the inner structural member 6 are formed, the outer-layer pieces 11 and the inner structural member 6 are bonded together (the bonding step S4). Specifically, at the bonding step S4, adhesive is applied to the outer surface of the inner structural member 6 thus formed (step S4a) to form the adhesive layer 7 on the outer surface of the inner structural member 6 (step S4b). Each of the outer-layer pieces 11 is adhered to the inner structural member 6 through the adhesive layer 7 to bond the outer-layer piece 11 and the inner structural member 6 to each other (step S4c). Then, with the divided outer-layer pieces 11 being all coupled to each other, the outer-layer pieces 11 are bonded to the inner structural member 6 so as to constitute the outer-layer member 5 on the outer surface of the inner structural member 6. Thus, the three-dimensional object 1 illustrated in FIGS. 1 and 2 is formed (step S4d).

As described above, according to embodiment 1, the plurality of divided outer-layer pieces 11 are coupled to constitute the outer-layer member 5 so as to dispose the inner structural member 6 in the inner space 3 of the outer-layer member 5. This configuration ensures that the outer-layer member 5 is supported by the inner structural member 6 to secure adequate strength of the three-dimensional object 1. Since the inner structural member 6 is formed by fused deposition molding to reduce the inner structural member 6 in weight, the three-dimensional object 1 is accordingly reduced in weight. Consequently, even the three-dimensional object 1 having a large size is readily handleable. Moreover, the inner structural member 6 is formed of the filament, which is a material available at low cost, to reduce cost for forming the three-dimensional object 1. Furthermore, since the outer-layer pieces 11 may be formed by the ink-jet head, efficiency of the formation work is improved as compared with a case of forming the whole three-dimensional object 1. At the same time, the inner structural member 6 is formed by highly efficient fused deposition molding so as to further improve the efficiency of the formation work.

According to embodiment 1, the outer-layer pieces 11 may be formed of the ultraviolet curable resin, and the inner structural member 6 may be formed of the thermoplastic resin. Thus, the outer-layer pieces 11 and the inner structural member 6 may be formed of different materials. This enables the outer-layer pieces 11 to be formed of a material suitable for the outer-layer pieces 11, and enables the inner structural member 6 to be formed of a material suitable for the inner structural member 6.

According to embodiment 1, the inner structural member 6 and the outer-layer member 5 are suitably bonded together through the adhesive layer 7 so as to prevent the outer-layer member 5 from coming off the inner structural member 6.

According to embodiment 1, the clearance between the inner structural member 6 and the outer-layer member 5 is filled up with the adhesive layer 7 so as to appropriately accommodate the inner structural member 6 in the inner space 3 of the outer-layer member 5 and to appropriately support the outer-layer member 5 by the inner structural member 6 through the adhesive layer 7.

According to embodiment 1, the plurality of outer-layer pieces 11 are divided by the plurality of cross-sections that are parallel to each other and at intervals of a predetermined height so as to form the outer-layer pieces 11 having the same height by the ink-jet head. Consequently, decreasing the height of the outer-layer pieces 11 ensures rapid formation of the outer-layer pieces 11 to improve efficiency of formation work of the outer-layer pieces 11.

Embodiment 2

Figure 6:
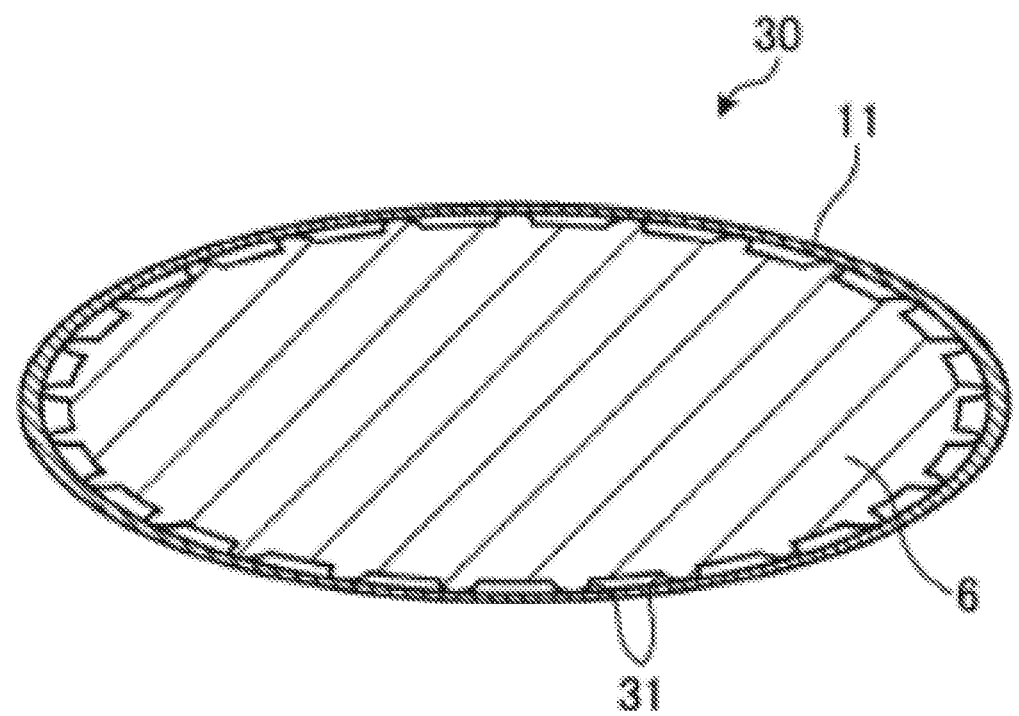
FIG. 6 is a cross-sectional view of a three-dimensional object according to embodiment 2.

Next, by referring to FIG. 6, a three-dimensional object 30 according to embodiment 2 will be described. In embodiment 2, to avoid overlapping descriptions, components different from those components in embodiment 1 will be described. Components having configurations similar to those components in embodiment 1 will be denoted with the same reference numerals and symbols and described. FIG. 6 is a cross-sectional view of the three-dimensional object 30 according to embodiment 2. It should be noted that FIG. 6 is the cross-sectional view of a portion of the palm in FIG. 1, taken along a plane perpendicular to the cross-section in FIG. 1.

The three-dimensional object 30 according to embodiment 2 includes the inner structural member 6 of embodiment 1 having an outer surface elastically deformable or plastically deformable. Specifically, as illustrated in FIG. 6, the inner structural member 6 includes a plurality of protrusions 31 protruding from the outer surface. The plurality of protrusions 31 have a dimension in the protrusion direction approximately equal to that of the clearance between the inner surface of the outer-layer member 5 and the outer surface of the inner structural member 6.

In forming the inner structural member 6, the protrusions 31 are formed to be integral to the inner structural member 6 and formed to have an elastically deformable or plastically deformable configuration. At the time of attaching the outer-layer piece 11 to the inner structural member 6, the protrusions 31 are deformed when an inner surface of the outer-layer piece 11 comes into contact with the protrusions 31. Consequently, the protrusions 31 serve as support points for the outer-layer piece 11 while suppressing deformation of the outer-layer piece 11. It should be noted that in a manner similar to embodiment 1, the adhesive layer 7 may be provided for filling up the clearance or may be disposed only on the protrusions 31 and should not be limited to a particular manner.

As described above, according to embodiment 2, when the plurality of protrusions 31 formed on the outer surface of the inner structural member 6 physically interfere with the inner surface of the outer-layer member 5, the plurality of protrusions 31 are elastically deformed or plastically deformed to support the outer-layer member 5 while suppressing deformation of the outer-layer member 5. This configuration ensures that occurrence of distortion of the outer-layer member 5 is eliminated or minimized, and that the outer-layer member 5 is suitably supported by the inner structural member 6, with the outer-layer member 5 being kept in the appropriate shape.

Embodiment 3

Figure 7:
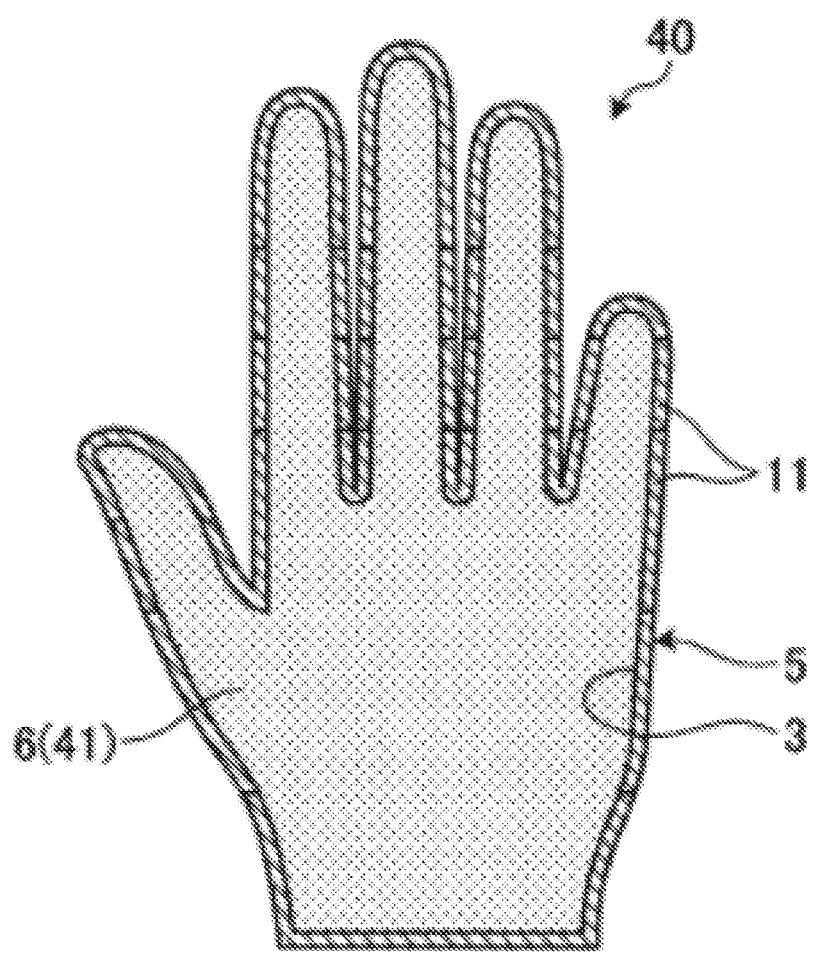
FIG. 7 is a cross-sectional view of a three-dimensional object according to embodiment 3.
Figure 8:
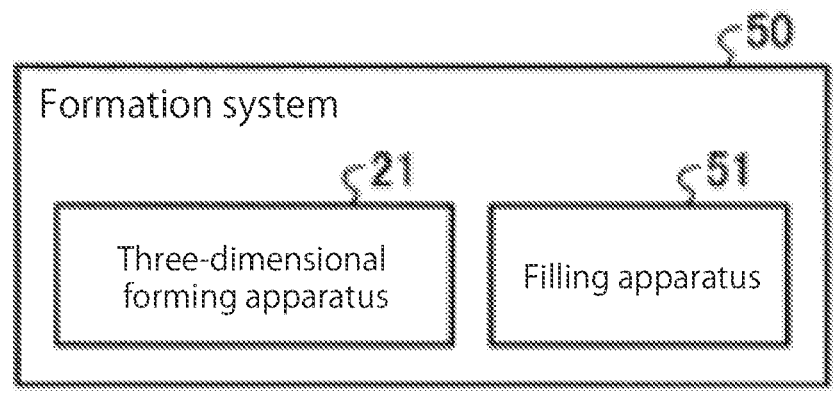
FIG. 8 is a diagram illustrating a schematic configuration of a formation system to form the three-dimensional object according to embodiment 3.
Figure 9:
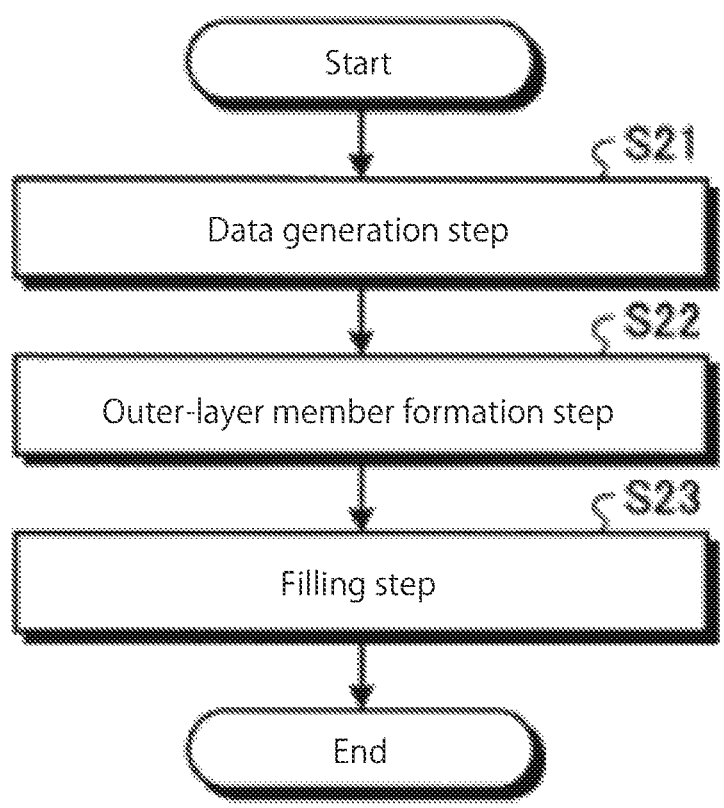
FIG. 9 is a flowchart of a method for forming the three-dimensional object according to embodiment 3.
Figure 10:
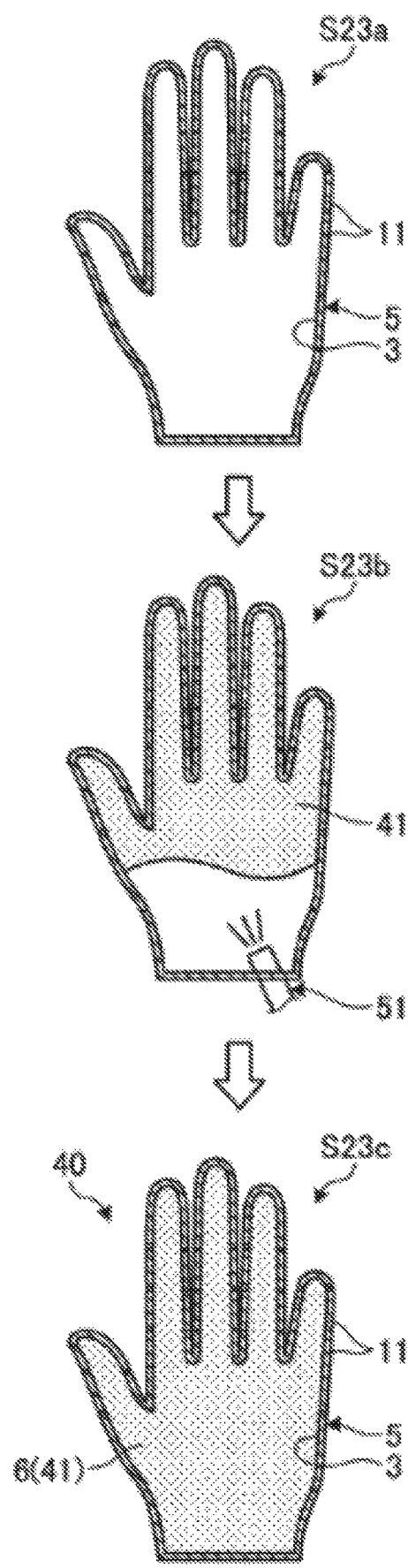
FIG. 10 is a diagram illustrating the method for forming the three-dimensional object according to embodiment 3.

Next, by referring to FIGS. 7 to 10, a three-dimensional object 40 according to embodiment 3 will be described. In embodiment 3 as well, to avoid overlapping descriptions, components different from those components in embodiments 1 and 2 will be described. Components having configurations similar to those components in embodiments 1 and 2 will be denoted with the same reference numerals and symbols and described. FIG. 7 is a cross-sectional view of the three-dimensional object 40 according to embodiment 3. FIG. 8 is a diagram illustrating a schematic configuration of a formation system to form the three-dimensional object 40 according to embodiment 3. FIG. 9 is a flowchart of a method for forming the three-dimensional object 40 according to embodiment 3. FIG. 10 is a diagram illustrating the method for forming the three-dimensional object 40 according to embodiment 3.

As illustrated in FIG. 7, the three-dimensional object 40 according to embodiment 3 includes filling material 41 to fill up the inner space 3 of the outer-layer member 5 in place of the inner structural member 6 of embodiment 1. Specifically, as the filling material 41 to constitute the inner structural member 6, material different from the material of the outer-layer member 5 is used, for example, foam material such as urethane foam and styrene foam. The filling material 41, which fills up the inner space 3 of the outer-layer member 5, is formed as the inner structural member 6.

The weight of the filling material 41 per unit volume is lighter than the weight of the outer-layer member 5 per unit volume. This ensures that the three-dimensional object 40, which has the inner structural member 6 support the outer-layer member 5, secures a predetermined strength. Reduction of the inner structural member 6 in weight accordingly ensures reduction of the three-dimensional object 40 in weight. It should be noted that the adhesive layer 7 may be disposed on the inner surface of the outer-layer member 5 in advance so as to bond the filling material 41 filled in the inner space 3 and the outer-layer member 5 to each other. The adhesive layer 7 may be omitted insofar as the filling material 41 is bondable to the outer-layer member 5.

Next, by referring to FIG. 8, the formation system 50 to form the three-dimensional object 40 will be described. The formation system 50 includes the three-dimensional forming apparatus 21 and a filling apparatus 51. The three-dimensional forming apparatus 21 is a 3D printer using an ink-jet technology. The filling apparatus 51 fills the filling material 41.

In the same manner as in embodiment 1, the three-dimensional forming apparatus 21 causes ultraviolet curable ink to be ejected and cured based on outer-layer member formation data generated based on formation data of the three-dimensional object 40 so as to form the plurality of outer-layer pieces 11.

The filling apparatus 51 includes an injection nozzle to inject the filling material 41. From the injection nozzle, the filling material 41 is jetted into the inner space 3 of the outer-layer member 5 to form the inner structural member 6 along the inner surface of the outer-layer member 5. That is, the filling apparatus 51 merely fills the filling material 41 into the inner space 3 of the outer-layer member 5 to form the inner structural member 6.

Next, by referring to FIGS. 9 and 10, a flow of the method for forming the three-dimensional object 40 will be described. The method for forming the three-dimensional object 40 includes a data generation step (step S21), an outer-layer member formation step (step S22), and a filling step (step S23). At the data generation step S21, the outer-layer member formation data is generated. At the outer-layer member formation step S22, the outer-layer member 5 is formed. At the filling step S23, the filling material 41 is filled.

In the method for forming the three-dimensional object 40, the formation system 50 first generates the outer-layer member formation data based on formation data of the three-dimensional object 40 (the data generation step S21). Description of generation of the outer-layer member formation data, which is approximately the same as in embodiment 1, will be omitted. When the outer-layer member formation data is generated, the three-dimensional forming apparatus 21 performs formation control based on the outer-layer member formation data so as to form the plurality of outer-layer pieces 11 (the outer-layer member formation step S22) similarly to the outer-layer member formation step S2 in embodiment 1.

When the plurality of outer-layer pieces 11 are formed, the outer-layer pieces 11 are combined to form the outer-layer member 5 including the inner space 3. Then, the filling apparatus 51 fills the filling material 41 into the inner space 3 of the outer-layer member 5 (the filling step S23). Specifically, at the filling step S23, in the case of combining the plurality of outer-layer pieces 11 together, adhesive tape is adhered to the outer surfaces of the outer-layer pieces 11, for example, to couple the outer-layer pieces 11 to each other. Thus, the outer-layer pieces 11 are all coupled together to form the outer-layer member 5 including the inner space 3 (step S23a). Then, the filling apparatus 51 fills the filling material 41 into the inner space 3 of the outer-layer member 5 (step S23b). In this case, at step S23a, to secure a filling port of the filling material 41 by the filling apparatus 51, some of the outer-layer pieces 11 may be detached in advance. After the filling material 41 flows along the inner surface of the outer-layer member 5, the shape of the filling material 41 is fixed to constitute the three-dimensional object 40 illustrated in FIG. 7 (step S23c).

As described above, according to embodiment 3, the plurality of divided outer-layer pieces 11 are joined together to constitute the outer-layer member 5 so as to dispose the inner structural member 6 in the inner space 3 of the outer-layer member 5. This configuration ensures that the outer-layer member 5 is supported by the inner structural member 6 to secure adequate strength of the three-dimensional object 40. Since the inner structural member 6 is formed of the filling material 41 to reduce the inner structural member 6 in weight, the three-dimensional object 40 is accordingly reduced in weight and made readily handleable. Moreover, the inner structural member 6 is formed of the filling material 41, which is a material available at low cost, to reduce cost for forming the three-dimensional object 40. Furthermore, since the outer-layer pieces 11 may be formed by the ink-jet head, efficiency of the formation work is improved as compared with a case of forming the whole three-dimensional object 40. At the same time, the inner structural member 6 is formed by merely filling the filling material 41 into the inner space 3 of the outer-layer member 5 so as to further improve the efficiency of the formation work.

Embodiment 4

Figure 11:
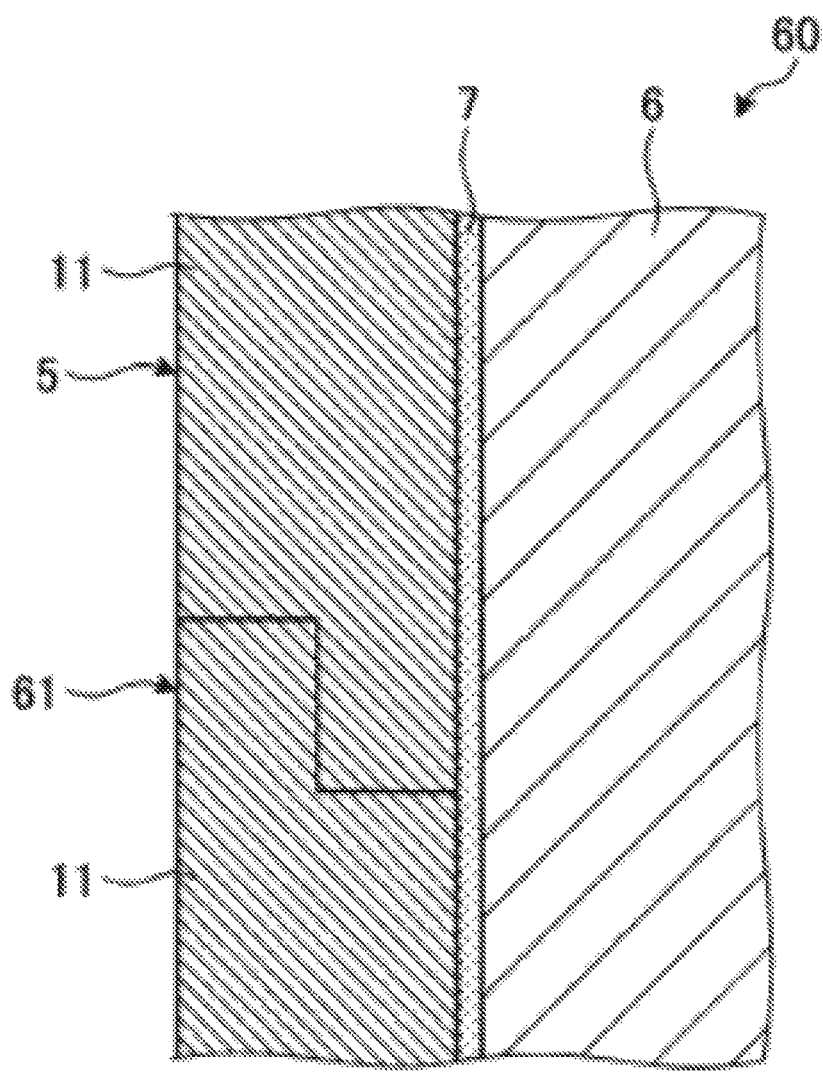
FIG. 11 is a cross-sectional view of a three-dimensional object according to embodiment 4.

Next, by referring to FIG. 11, a three-dimensional object 60 according to embodiment 4 will be described. In embodiment 4, to avoid overlapping descriptions, components different from those components in embodiments 1 to 3 will be described. Components having configurations similar to those components in embodiments 1 to 3 will be denoted with the same reference numerals and symbols and described. FIG. 11 is a cross-sectional view of the three-dimensional object 60 according to embodiment 4.

In the three-dimensional object 60 according to embodiment 4, each of the outer-layer pieces 11 includes at least one coupling portion 61 to be coupled to another of the outer-layer pieces 11. The coupling portion 61 is formed along an edge portion of the outer-layer piece 11, and has such a concavo-convex shape that the edge portion has a stepped cross-section. Consequently, each adjacent pair of the outer-layer pieces 11 are coupled together by fitting a convex coupling portion 61 of one of the outer-layer pieces 11 to a concave coupling portion 61 of the other adjacent outer-layer piece 11. It should be noted that the coupling portions 61 should not be limited to particular shapes but may be a coupling pin and a coupling hole that have a concavo-convex combination.

As described above, according to embodiment 4, since the outer-layer pieces 11 are coupled to each other through the coupling portions 61, the plurality of outer-layer pieces 11 are assembled with high accuracy while the outer-layer pieces 11 are prevented from being separated from each other so as to make the outer-layer member 5 have an appropriate shape. It should be noted that the coupling portions 61 in embodiment 4 are applicable to the outer-layer pieces 11 in embodiments 1 to 3.

Embodiment 5

Figure 12:
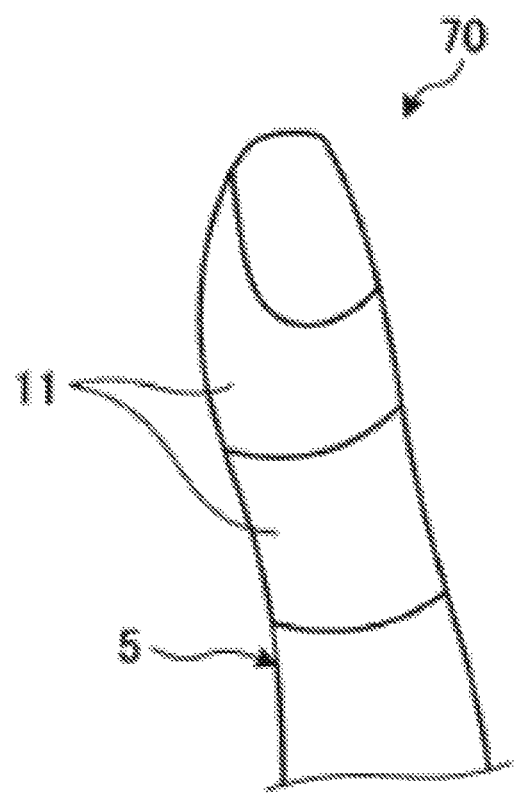
FIG. 12 is an external perspective view of a three-dimensional object according to embodiment 5, indicating its division lines.

Next, by referring to FIG. 12, a three-dimensional object 70 according to embodiment 5 will be described. In embodiment 5, to avoid overlapping descriptions, components different from those components in embodiments 1 to 4 will be described. Components having configurations similar to those components in embodiments 1 to 4 will be denoted with the same reference numerals and symbols and described. FIG. 12 is an external perspective view of the three-dimensional object 70 according to embodiment 5, indicating its division lines.

The outer-layer member 5 in embodiment 5 is divided into the plurality of outer-layer pieces 11 in accordance with a plurality of characteristic regions of the three-dimensional object 70. Specifically, in a case where the three-dimensional object 70 has a hand shape, there are characteristic regions such as a nail region, a region of a finger from the fingertip to the first joint, and a region of the finger from the first joint to the second joint. In accordance with these regions, the plurality of outer-layer pieces 11 are formed. It should be noted that the characteristic regions of the three-dimensional object 70, which vary depending on kinds of the three-dimensional object 70, should not be limited to particular regions but may be optional regions.

As described above, according to embodiment 5, since the outer-layer pieces 11 are formed in accordance with the respective characteristic regions of the three-dimensional object 70, it is ensured that division lines of the outer-layer member 5, which is an assembly of the plurality of outer-layer pieces 11, are made inconspicuous to enhance priority on the design of the three-dimensional object 70. It should be noted that division of the outer-layer pieces 11 in embodiment 5 is applicable to the outer-layer pieces 11 in embodiments 1 to 4.

Obviously, numerous modifications and variations of the present disclosure are possible in light of the above teachings. It is therefore to be understood that within the scope of the appended claims, the present disclosure may be practiced otherwise than as specifically described herein.

1, 30, 40, 60, 70 Three-dimensional object
3 Inner space
5 Outer-layer member
6 Inner structural member
7 Adhesive layer
11 Outer-layer piece
20 Formation system
21 Three-dimensional forming apparatus
22 FDM apparatus
31 Protrusion
41 Filling material
50 Formation system
51 Filling apparatus
61 Coupling portion

What is claimed is:

1. A method for forming a three-dimensional object, the method comprising:
    forming an outer-layer member comprising a layer to constitute a surface of the three-dimensional object, and comprising an inner space, the outer-layer member comprising a plurality of divided outer-layer pieces, which are formed by ejecting functional ink from a droplet ejection head and curing the ejected functional ink;
    forming an inner structural member disposed in the inner space of the outer-layer member and configured to support the outer-layer member; and
    bonding the outer-layer member to an outer surface of the inner structural member so as to constitute the three-dimensional object,
    wherein, in the forming the outer-layer member, the outer-layer member is formed by an ink-jet technology using coloring inks of a plurality of colors,
    wherein, in the forming the inner structural member, the inner structural member is formed by curing a filament, and
    wherein the method further comprises generating, based on formation data related to a shape of the three-dimensional object, outer-layer member formation data for forming the outer-layer member by forming the plurality of divided outer-layer pieces by the ink-jet technology, and inner structural member formation data for forming the inner structural member by curing the filament.

2. The method according to claim 1, wherein
    the outer surface of the inner structural member is elastically deformable or plastically deformable,
    in the forming the inner structural member, a plurality of protrusions protruding from the outer surface are formed on the inner structural member, and
    in the bonding the outer-layer member to the outer surface of the inner structural member, the plurality of protrusions are deformed when an inner surface of the plurality of divided outer-layer pieces comes into contact with the plurality of protrusions.

3. The method according to claim 1, wherein
    each of the plurality of divided outer-layer pieces includes at least one coupling portion to be coupled to another one of the plurality of divided outer-layer pieces, the coupling portion being formed along an edge portion of each of the plurality of divided outer-layer pieces, and having a concavo-convex shape such that the edge portion has a stepped cross-section.

4. A method for forming a three-dimensional object, the method comprising:
    forming an outer-layer member comprising a layer to constitute a surface of the three-dimensional object, and comprising an inner space, the outer-layer member comprising a plurality of outer-layer pieces, which are divided by a cross-section and formed by ejecting functional ink from a droplet ejection head and curing the ejected functional ink; and
    filling the inner space of the outer-layer member with filling material to constitute an inner structural member configured to support the outer-layer member so as to constitute the three-dimensional object, the inner space of the outer-layer member being filled with the filling material after the plurality of outer-layer pieces are assembled to form the outer-layer member comprising the inner space,
    wherein, in the forming the outer-layer member, the outer-layer member is formed by a deposition forming method by an ink-jet using coloring inks of a plurality of colors, wherein the method further comprises generating, based on formation data related to a shape of the three-dimensional object, outer-layer member formation data for forming the outer-layer member, and wherein, in the generating the outer-layer member formation data, the outer-layer member formation data is generated such that a characteristic region becomes the cross-section, the characteristic region enabling a division line where the cross-sections are in contact with each other in the three-dimensional object to be inconspicuous.

5. The method according to claim 4, wherein each of the plurality of divided outer-layer pieces includes at least one coupling portion to be coupled to another one of the plurality of divided outer-layer pieces, the coupling portion being formed along an edge portion of each of the plurality of divided outer-layer pieces, and having a concavo-convex shape such that the edge portion has a stepped cross-section.

* * * * *